April 10, 1951

G. W. MEADOWS 2,547,957

PISTON RING SEAL

Filed Nov. 15, 1947

INVENTOR
G.W. MEADOWS
AGENT

Patented Apr. 10, 1951

2,547,957

UNITED STATES PATENT OFFICE 2,547,957

PISTON RING SEAL

George W. Meadows, Irvington, N. Y., assignor to Philips Laboratories, Inc., Irvington on Hudson, N. Y.

Application November 15, 1947, Serial No. 786,290

5 Claims. (Cl. 309—2)

This invention relates to piston and cylinder construction and more particularly to novel arrangements for controlling the lubricating fluid of a piston and cylinder assembly of an engine or compressor.

It has been found that in the normal operation of a piston and cylinder assembly the lubricating fluid for the piston and cylinder is subject to a pumping action which causes the fluid to flow to the top of the piston head and into the working chamber of the engine. The lubrication so displaced into the working chamber of an engine usually produces a carbon and gum residual, which adversely effects the operating efficiency of the engine, while such lubrication in the work medium of a compressor is equally distracting to the good performance of the compressor.

In pistons having piston rings, it has been found that the said pumping action is brought about by the necessity of providing a sufficient clearance between the walls of the piston ring grooves and the piston rings to allow normal expansion of these elements in the operation of the engine. Because of this clearance, the rings move relative to the grooves and this movement is a maximum at approximately 30° to 15° before dead center of movement of the piston. This movement of the ring particularly at the top dead center position of the piston causes the lubricant, which has found its way into the clearance space between ring and groove to be forced therefrom. As the piston reciprocates during operation, the continual repetition of such action causes a build-up of lubricant above the position and in the working chamber, to an excessive amount thereby bringing about the formation of carbon and gum residual pointed out above.

The object of this invention is to provide a piston and cylinder construction which will prevent a build-up of lubricant above the piston and in the working chamber of an engine or compressor.

A further object of this invention is to eliminate the possibilities of carbon and gum deposits in the working cylinder of an engine or compressor.

Another object of this invention is to provide for a lubrication controlled piston and cylinder construction which is simple in structure and reliable in operation.

These and further objects of the invention as well as the novel features of the construction will become apparent from the following specification, when considered together with the accompanying drawing, in which.

In accordance with the invention, the foregoing objects are realized by means of a cylinder having its internal wall provided with a peripheral annular groove at the region of the top of the piston travel and a longitudinal groove extending from the said annular groove to a point of the cylinder surface below the position of the rings at the top of the piston stroke. The piston is provided with an aperture which connects with the bottom of the longitudinal groove at the top of the piston movement. In the foregoing arrangement the annular groove serves as an accumulator for any lubricant which is driven out from the top piston ring due to the deceleration force on the rings as the piston approaches top dead center, the so collected lubricant thus being prevented from continuing on into the working space above the piston. The longitudinal groove serves as a relief drain for the accumulated lubricant and by means of the aperture in the piston, the lubricant is returned to the bottom side of the piston. In this manner the working space above the piston is in open communication with the crankcase spaced below the piston when the piston is in top dead center position, and at that instant the pressure differences existing between said spaces, forces the lubricant from the accumulator groove to the engine crankcase.

In order that the invention may be clearly understood it will now be described with reference to the accompanying drawing, which shows by way of example, an embodiment thereof.

Figure 1:
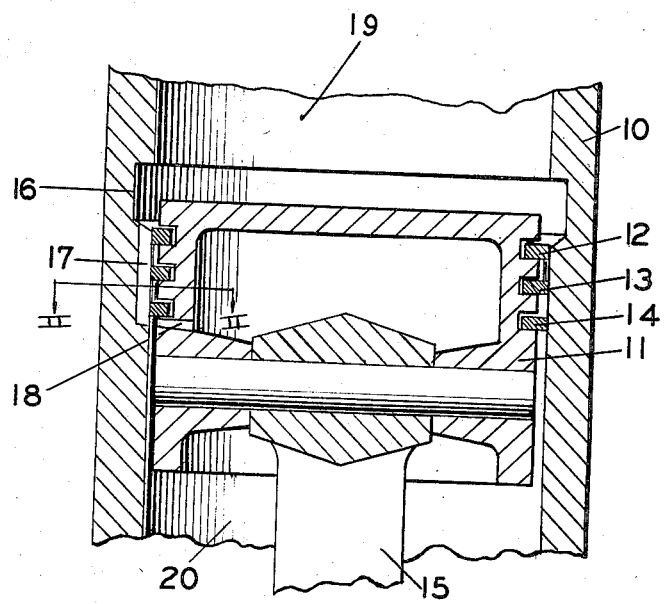
Fig. 1 is a vertical cross section partial view of a cylinder and piston assembly in accordance with the invention.
Figure 2:
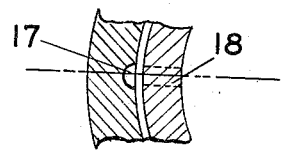
Fig. 2 is a cross section view taken along the line II—II of Fig. 1.

In Fig. 1 the piston is shown approaching top dead center position. Numeral 10 indicates a cylinder (shown in part) having a wall portion in which is slidably arranged a position 11, which has piston rings 12, 13 and 14, the rings having a certain amount of clearance with the piston ring grooves as indicated in the drawing. The piston is connected to a connecting rod 15 in the usual manner as shown. Numeral 19 indicates a high pressure volume above the piston while numeral 20 indicates a portion of the crankcase volume below the piston which is at a lower pressure than the volume 19. The cylinder 10 is provided with an annular groove 16 extended about the inner surface of the cylinder, and is positioned so that approximately one half the height of piston ring 12 passes above the lower edge of the groove as shown, when the piston 11 is in top dead center position. A second groove 17 extends downwardly along the inner wall of the cylinder to a distance slightly below piston ring 14, the lower end being in alignment at top dead center with a hole 18 radially positioned in the piston wall. If found desirable several groove and hole arrangements like 17 and 18 can be provided. For the purpose of clarification, the clearance between the piston outside diameter and the cylinder inside diameter is exaggerated, however, in actual practice a clearance of only a few thousandths of an inch is maintained.

As the piston approaches top dead center position due to the deceleration force, the piston rings are forced to the top of the piston ring groove and lubricant is forced out from the top of piston ring 12. This lubricant accumulates in the groove 16 and due to a pressure differential existing between the spaces 19 and 20, is delivered to the engine crankcase by means of groove 17 and hole 18, during the time that the piston is at top dead center position.

It is now apparent that the new and novel lubrication control which I have disclosed above will effectively prevent a build-up of lubricant in the working chamber of an engine cylinder, and is simple in structure and reliable in operation. While I have shown and described a particular embodiment of the invention, it is conceded that variations may be made in form without departing from the true spirit of the invention.

What I claim is:

1. A cylinder and piston assembly comprising a reciprocable piston member, and a cylinder having an interior wall portion provided with a groove system comprising a peripherally disposed groove portion and a downwardly extending groove portion, sadi groove system being positioned in said cylinder so that the lower edge of said peripheral groove portion is overlapped by the top of said piston during top dead center piston position while the lower end of said downwardly extending groove portion is in direct connection with an open region below said piston during top dead center piston position.

2. A cylinder and piston assembly comprising a reciprocable piston member having a conduit means located through a wall thereof, and a cylinder having an interior wall portion provided with a groove system comprising a peripherally disposed groove portion and a downwardly extending groove portion, said groove system being positioned in said cylinder so that the lower edge of said peripheral groove portion is overlapped by the top of said piston during top dead center piston position while the lower end of said downwardly extending groove portion is in direct connection with said conduit means during top dead center piston position.

3. A cylinder and piston assembly comprising a reciprocable piston member provided with a peripheral groove, a piston ring in said groove, and a cylinder having an interior wall portion provided with a groove system comprising a peripherally disposed groove portion and a downwardly extending groove portion, said groove system being positioned in said cylinder so that the lower edge of said peripheral groove portion is overlapped by said piston ring during top dead center piston position while the lower end of said downwardly extending groove portion is in direct connection with an open region below said piston during top dead center piston position.

4. A cylinder and piston assembly comprising a reciprocable piston member provided with a peripheral groove and a conduit means arranged below said groove and located through a wall of said piston, a piston ring in said groove, and a cylinder having an interior wall portion provided with a groove system comprising a peripherally disposed groove portion and a longitudinal groove portion extending therefrom, said groove system being positioned in said cylinder so that the lower edge of said peripheral groove portion is overlapped by said piston ring during top dead center piston position while the lower end of said longitudinal groove portion is in direct connection with said conduit means during top dead center piston position.

5. A cylinder and piston assembly comprising a reciprocable piston member provided with a peripheral groove and a conduit means arranged below said groove and radially located through a wall of said piston, a piston ring in said groove, and a cylinder having an interior wall portion provided with a groove system comprising a peripherally disposed groove portion and a longitudinal groove portion extending downwardly therefrom, said groove system being positioned in said cylinder so that the upper edge of said peripheral groove portion is above the top of said piston during top dead center piston position and being further positioned so that the lower edge of said peripheral portion is overlapped by said piston ring during top dead center piston position while the lower end of said longitudinal groove portion is in direct connection with said conduit means during top dead center piston position.

GEORGE W. MEADOWS.

REFERENCES CITED

The following references are of record in the file of this patent:

UNITED STATES PATENTS

| Number | Name | Date |
| --- | --- | --- |
| 648,153 | Serve | Apr. 24, 1900 |
| 754,121 | Brush | Mar. 8, 1904 |
| 1,846,282 | Summers | Feb. 23, 1932 |